US012129674B2

(12) United States Patent
Liu et al.

(10) Patent No.: US 12,129,674 B2
(45) Date of Patent: Oct. 29, 2024

(54) FOUNDATION BOLT PRE-EMBEDDING POSITIONING MOLD AND METHOD FOR MOUNTING FOUNDATION BOLT

(71) Applicant: China Eleventh Chemical Construction Co., Ltd., Henan (CN)

(72) Inventors: Zhongpei Liu, Henan (CN); Ying Wan, Henan (CN); Yafei Geng, Henan (CN); Yunguang Chen, Henan (CN)

(73) Assignee: China Eleventh Chemical Construction Co., Ltd., Henan (CN)

( * ) Notice: Subject to any disclaimer, the term of this patent is extended or adjusted under 35 U.S.C. 154(b) by 672 days.

(21) Appl. No.: 17/233,144

(22) Filed: Apr. 16, 2021

(65) Prior Publication Data

US 2022/0213704 A1 Jul. 7, 2022

(30) Foreign Application Priority Data

Jan. 6, 2021 (CN) ......................... 202110015799.1

(51) Int. Cl.
*E04G 21/18* (2006.01)
*B25H 7/04* (2006.01)

(52) U.S. Cl.
CPC ............. *E04G 21/185* (2013.01); *B25H 7/04* (2013.01)

(58) Field of Classification Search
CPC .......... E04G 21/185; B25H 7/04; B25H 7/02; E04B 1/4157
USPC ...... 33/613, 562, 624, 644, 645; 249/91, 93, 249/219.1; 52/699
See application file for complete search history.

(56) References Cited

U.S. PATENT DOCUMENTS

| | | | | |
|---|---|---|---|---|
| 1,580,281 A * | 4/1926 | Bowe | B28B 23/18 | 249/166 |
| 2,590,478 A * | 3/1952 | Weinberg | B28B 23/043 | 425/111 |
| 2,979,801 A * | 4/1961 | Gasmire | E04C 5/16 | 249/91 |

(Continued)

FOREIGN PATENT DOCUMENTS

| | | | |
|---|---|---|---|
| CA | 2800410 A1 * | 7/2014 | E04G 13/00 |
| CN | 109958195 A * | 7/2019 | E04B 1/4157 |

(Continued)

OTHER PUBLICATIONS

Translation of CN 109958195 A. (Year: 2019).*

*Primary Examiner* — Christine T Cajilig
(74) *Attorney, Agent, or Firm* — Neal, Gerber & Eisenberg LLP

(57) ABSTRACT

Provided are a foundation bolt pre-embedding positioning mold and a method for mounting a foundation bolt, including a centerline positioning assembly and a vertical positioning assembly for mounting on foundation steel bar, wherein the centerline positioning assembly includes a positioning template horizontally arranged, a positioning portion is formed on the positioning template, the positioning portion extends along a first direction, the positioning portion is used to overlap with a preset centerline in a vertical direction, and the first direction is a length direction of the positioning template; the positioning template is configured to be mounted on the vertical positioning assembly, so as to fix a position of the positioning template in the vertical direction; and a first mounting hole is formed in the positioning template, so as to vertically fix the foundation bolt to the positioning template.

5 Claims, 4 Drawing Sheets

(56) References Cited

U.S. PATENT DOCUMENTS

| | | | | | |
|---|---|---|---|---|---|
| 3,219,308 | A * | 11/1965 | Halstead | E02D 27/00 | 249/48 |
| 3,963,210 | A * | 6/1976 | Macklin | E04G 21/185 | 249/91 |
| 4,228,985 | A * | 10/1980 | Gaudelli | B28B 23/02 | 249/122 |
| 4,261,544 | A * | 4/1981 | Addison | E04G 21/185 | 249/207 |
| 4,736,554 | A * | 4/1988 | Tyler | E04B 1/0007 | 52/700 |
| 4,790,509 | A * | 12/1988 | Cardwell | E04G 17/14 | 248/65 |
| 6,120,723 | A * | 9/2000 | Butler | E04B 5/10 | 249/34 |
| 6,643,945 | B1 * | 11/2003 | Starks | E04G 21/185 | 33/562 |
| 7,445,192 | B2 * | 11/2008 | Gridley | E04B 1/4157 | 249/207 |
| 7,707,797 | B2 * | 5/2010 | Henderson | F03D 13/22 | 405/252.1 |
| 7,931,250 | B2 * | 4/2011 | Vappula | B28B 7/002 | 249/169 |
| 8,555,518 | B2 * | 10/2013 | Tooman | E04G 21/185 | 33/645 |
| 9,937,643 | B2 * | 4/2018 | Goss | E02D 27/32 | |
| 2002/0000076 | A1 * | 1/2002 | Goeku | E04H 12/2276 | 52/745.1 |
| 2009/0044482 | A1 * | 2/2009 | Tooman | E02D 27/42 | 52/699 |
| 2015/0113886 | A1 * | 4/2015 | Chang | E04C 5/168 | 52/745.19 |
| 2022/0235566 | A1 * | 7/2022 | Leonard | E04B 1/4157 | |

FOREIGN PATENT DOCUMENTS

| | | | | | |
|---|---|---|---|---|---|
| CN | 110029826 | A | * | 7/2019 | E04G 21/185 |
| CN | 112727124 | A | * | 4/2021 | B25H 7/04 |
| FR | 2292084 | A1 | * | 6/1976 | E04G 21/185 |
| KR | 20020077586 | A | * | 10/2002 | E04G 21/185 |
| KR | 101235758 | B1 | * | 2/2013 | E04G 21/185 |
| KR | 20210002781 | U | * | 12/2021 | B25H 7/02 |
| WO | WO-9525209 | A1 | * | 9/1995 | B28B 23/005 |

* cited by examiner

FOUNDATION BOLT PRE-EMBEDDING POSITIONING MOLD AND METHOD FOR MOUNTING FOUNDATION BOLT

CROSS-REFERENCE TO RELATED APPLICATION

This application claims priority to Chinese Patent Application No. 2021100157991, filed with the Chinese Patent Office on Jan. 6, 2021, entitled "Foundation Bolt Pre-embedding Positioning Mold and Method for Mounting Foundation bolt", which is incorporated herein by reference in its entirety.

TECHNICAL FIELD

The present disclosure relates to the technical field of building and construction, in particular, to a foundation bolt pre-embedding positioning mold and a method for mounting a foundation bolt.

BACKGROUND ART

At present, equipment such as coal scraper and stacker-reclaimer applied to a coal homogenizing warehouse in coal storage and transportation unit project belongs to an ultra-long unit, accurate positioning for pre-embedding of foundation bolt of the ultra-long unit currently is an important key section and focus, and the pre-embedding accuracy of bolt determines whether the installation of the unit can be performed smoothly, and even affects the service life of the unit, therefore, how to realize accurate positioning for pre-embedding of the foundation bolt of the ultra-long unit is a problem to be solved urgently at present.

SUMMARY

In one aspect, the present disclosure provides a foundation bolt pre-embedding positioning mold, including a centerline positioning assembly and a vertical positioning assembly for mounting on foundation steel bar, wherein the centerline positioning assembly includes a positioning template horizontally arranged, a positioning portion is formed (provided) on the positioning template, the positioning portion extends along a first direction, the positioning portion is used to overlap with a preset centerline in a vertical direction, and the first direction is a length direction of the positioning template; the positioning template is configured to be mounted on the vertical positioning assembly, so as to fix a position of the positioning template in the vertical direction; and a first mounting hole is formed in the positioning template, so as to vertically fix the foundation bolt to the positioning template.

In another aspect, the present disclosure provides a method for mounting a foundation bolt, wherein the method is implemented by applying the above foundation bolt pre-embedding positioning mold, and the method includes:

selecting a position of the preset centerline based on dimension of an equipment foundation, and marking the preset centerline;

selecting a position of the vertical positioning assembly based on the preset centerline, and fixing the vertical positioning assembly on foundation steel bar;

mounting the positioning template to the vertical positioning assembly, and overlapping the positioning portion with the preset centerline in a vertical direction; and mounting the foundation bolt in the first mounting hole in the positioning template.

BRIEF DESCRIPTION OF DRAWINGS

In order to more clearly illustrate technical solutions of embodiments of the present disclosure, accompanying drawings which need to be used in the description of the embodiments will be introduced below briefly. Apparently, the accompanying drawings in the following description are for some embodiments of the present disclosure, and a person ordinarily skilled in the art still could obtain other relevant accompanying drawings according to these accompanying drawings, without using any creative efforts.

REFERENCE SIGNS

Figure 1:
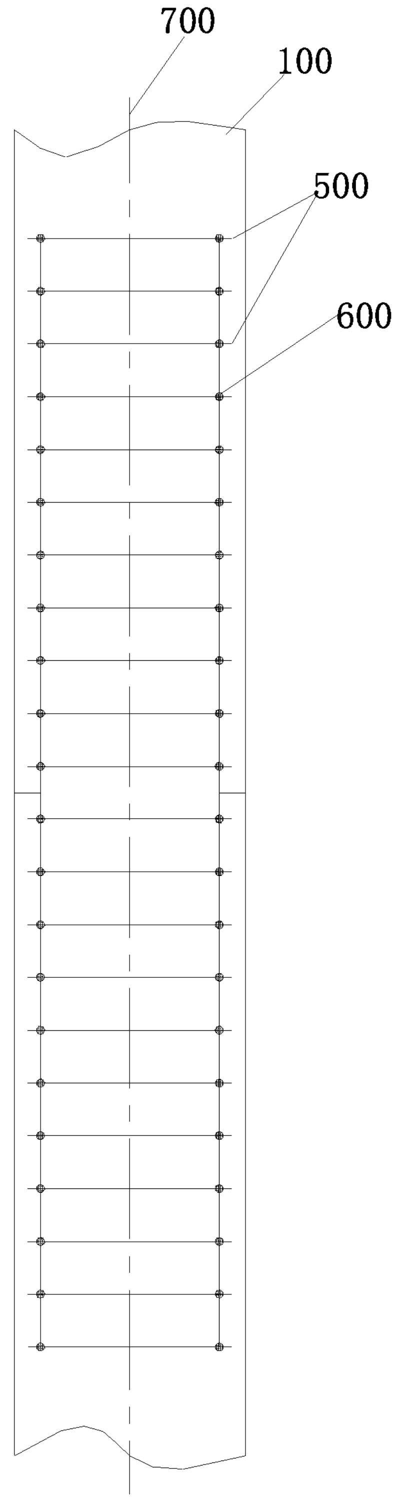
FIG. 1 is a top structural schematic view of an embodiment of a mounted foundation bolt pre-embedding positioning mold provided in an embodiment of the present disclosure.
Figure 2:
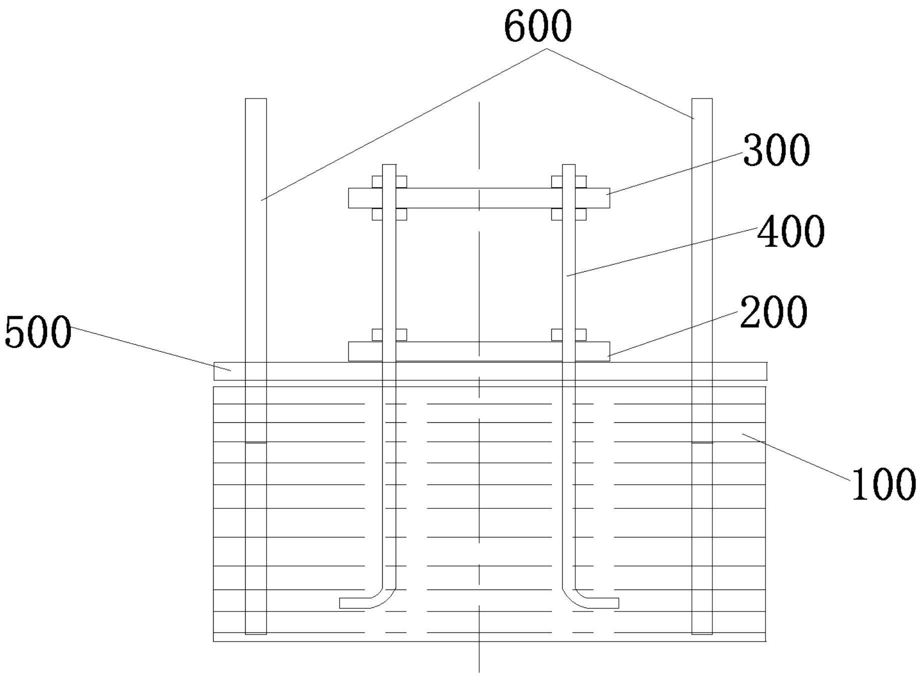
FIG. 2 is a front structural schematic view of an embodiment of the mounted foundation bolt pre-embedding positioning mold provided in an embodiment of the present disclosure.
Figure 3:
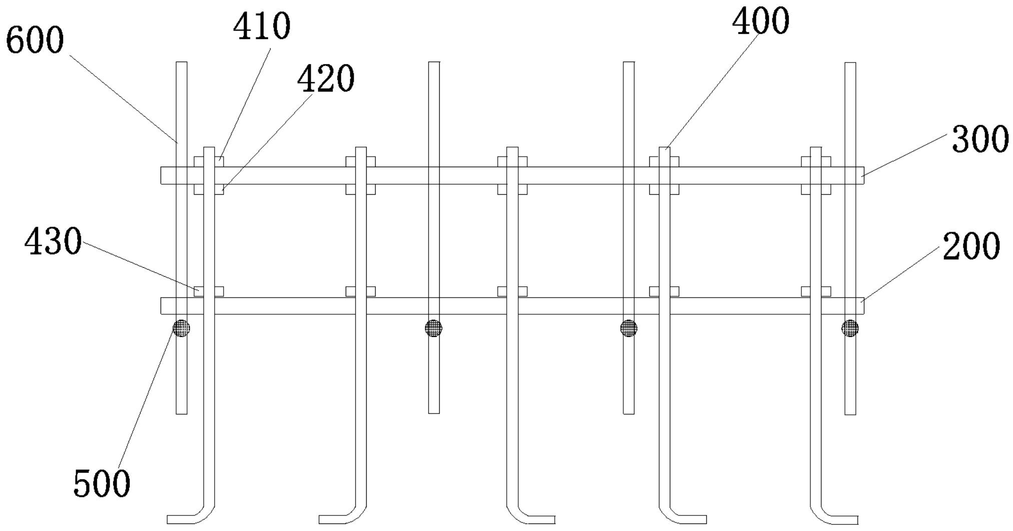
FIG. 3 is a side structural schematic view of an embodiment of the mounted foundation bolt pre-embedding positioning mold provided in an embodiment of the present disclosure.
Figure 4:
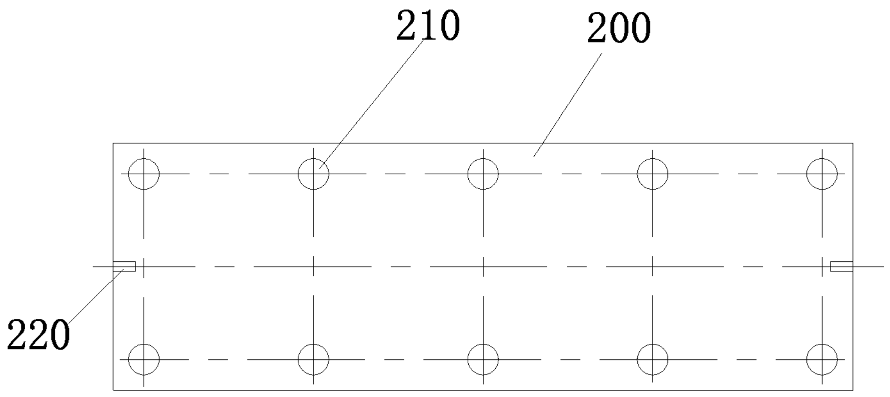
FIG. 4 is a top structural schematic view of an embodiment of a positioning template provided in an embodiment of the present disclosure.

100—equipment foundation;
200—positioning template;
210—first mounting hole;
220—positioning portion;
300—straightening template;
400—foundation bolt;
410—first straightening nut;
420—second straightening nut;
430—positioning nut
500—transverse rib;
600—column;
700—preset centerline.

DETAILED DESCRIPTION OF EMBODIMENTS

Technical solutions of the present disclosure will be described below clearly and completely in connection with accompanying drawings. Apparently, the embodiments described are only a part of embodiments of the present disclosure, rather than all embodiments. All of other embodiments obtained by those ordinarily skilled in the art based on the embodiments in the present disclosure without using any creative efforts shall fall within the scope of protection of the present disclosure.

In the description of the present disclosure, it should be indicated that orientation or positional relations indicated by terms "center", "upper", "lower", "left", "right", "vertical", "horizontal", "inner", "outer" and so on are based on orientation or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying importance in the relativity.

In the description of the present disclosure, it should be indicated that unless otherwise specified and defined explicitly, terms "mount", "join", "connect" should be construed in a broad sense. For example, it may be fixed connection, detachable connection, or integral connection; it may be mechanical connection, and also may be electrical connection; it may be direct connection, indirect connection via an intermediate medium, or inner communication between two elements. For those ordinarily skilled in the art, specific meanings of the above-mentioned terms in the present disclosure could be understood according to specific circumstances.

An objective of the present disclosure lies in providing a foundation bolt pre-embedding positioning mold and a method for mounting a foundation bolt for solving the problem how to realize accurate positioning for pre-embedding of foundation bolt of an ultra-long unit.

In order to achieve the above objective, the present disclosure adopts the following technical solution.

In one aspect, the present disclosure provides a foundation bolt pre-embedding positioning mold, including a centerline positioning assembly and a vertical positioning assembly for mounting on foundation steel bar, wherein the centerline positioning assembly includes a positioning template horizontally arranged, a positioning portion is formed (provided) on the positioning template, the positioning portion extends along a first direction, the positioning portion is used to overlap with a preset centerline in a vertical direction, and the first direction is a length direction of the positioning template; the positioning template is configured to be mounted on the vertical positioning assembly, so as to fix a position of the positioning template in the vertical direction; and a first mounting hole is formed in the positioning template, so as to vertically fix the foundation bolt to the positioning template.

Optionally, the positioning portion is a positioning through slot formed in the positioning template.

The beneficial technical effect of this technical solution lies in that this makes the positioning portion easier to process, and in the positioning process, an operator may observe through the positioning through slot whether it is aligned with the preset centerline, further improving the positioning accuracy.

Optionally, the first mounting hole is provided on two sides of the positioning portion in a second direction, a distance between each of the first mounting holes and the positioning portion in the second direction is equal, the second direction is perpendicular to the first direction, and the second direction is horizontally provided.

The beneficial technical effect of this technical solution lies in that when the positioning template is processed, first, a position of each first mounting hole is determined accurately through the distance relationship between the plurality of first mounting holes and the positioning portion, which facilitates improving the accuracy of mounting the foundation bolt.

Optionally, the respective first mounting holes in the same cross section of the positioning template form a mounting hole group, there are a plurality of the mounting hole groups, and the respective mounting hole groups are uniformly distributed in the first direction.

The beneficial technical effect of this technical solution lies in that by means of the foundation bolt pre-embedding positioning mold, accurate positioning of each foundation bolt may be simultaneously realized, and construction efficiency is improved.

Optionally, the centerline positioning assembly further includes a straightening template, wherein the straightening template is located on a side of the positioning template facing away from the vertical positioning assembly, and a second mounting hole for mounting the foundation bolt is formed in the straightening template, the number of the second mounting holes is the same as the number of the first mounting holes, and the respective first mounting holes and the respective second mounting holes are provided in one-to-one correspondence in the vertical direction, so that the positioning template and the straightening template are connected by the foundation bolt The beneficial technical effect of this technical solution lies in that when positioning a plurality of foundation bolts, by providing the straightening template and the second mounting holes therein, the perpendicularity of the foundation bolts can be adjusted according to the respective foundation bolts, the positioning template, and adjustment of the position limiting relationship between the templates, so as to improve the positioning accuracy of the foundation bolts.

Optionally, the straightening template is parallel to the positioning template.

The beneficial technical effect of this technical solution lies in that in this way, when the straightening template and the positioning template are parallel to each other, an axial direction of each second mounting hole is perpendicular to the straightening template, further ensuring the perpendicularity of the foundation bolt mounted in each second mounting hole.

Optionally, the vertical positioning assembly includes a column and a transverse rib, the column is vertically provided so as to fix a bottom end of the column to foundation steel bar, the transverse rib is fixed to the column, and the transverse rib is horizontally provided so as to mount the positioning template to the transverse rib.

The beneficial technical effect of this technical solution lies in that the position of the positioning template in the vertical direction can be quickly determined by placing the positioning template by the transverse rib whose position in the vertical direction is determined, then the construction efficiency can be improved under the premise of ensuring certain positioning accuracy.

Optionally, two sides of the positioning template are both provided with the column in the second direction, one end of the transverse rib is connected to the column on one side of the positioning template, the other end of the transverse rib is connected to the column on the other side of the positioning template, the second direction is horizontal, and the second direction is perpendicular to the first direction.

The beneficial technical effect of this technical solution lies in that connecting the transverse rib to the columns on the two sides of the positioning template can improve the mounting strength of the transverse rib, further ensuring the stability of the positions of the positioning template and the foundation bolt, making the foundation bolt less movable during construction, and further improving the construction accuracy.

Optionally, the transverse rib extends along the second direction.

The beneficial technical effect of this technical solution lies in that this allows the length of the transverse rib to be relatively short, thereby reducing the production cost.

Optionally, at least two such columns are provided on each side of the positioning template in the second direction, and the respective columns provided on the same side of the positioning template are uniformly distributed in the first direction.

The beneficial technical effect of this technical solution lies in that providing at least two columns can allow mounting the transverse rib between the columns on the two side of the positioning template, so that the positioning template is mounted on a plurality of transverse ribs, thus improving the positioning accuracy of the foundation bolts, and the stability of the foundation bolt pre-embedding positioning mold during construction.

In another aspect, the present disclosure provides a method for mounting a foundation bolt, wherein the method is implemented by applying the above foundation bolt pre-embedding positioning mold, and the method includes:

selecting a position of the preset centerline based on dimension of an equipment foundation, and marking the preset centerline;

selecting a position of the vertical positioning assembly based on the preset centerline, and fixing the vertical positioning assembly on foundation steel bar;

mounting the positioning template to the vertical positioning assembly, and overlapping the positioning portion with the preset centerline in a vertical direction; and mounting the foundation bolt in the first mounting hole in the positioning template.

Optionally, the selecting a position of the preset centerline based on dimension of an equipment foundation, and marking the preset centerline includes:

selecting a first center point and a second center point respectively at two ends of the equipment foundation in a length direction with a dotting positioning instrument, marking positions of the first center point and the second center point in the horizontal direction and the vertical direction, and connecting the first center point and the second center point through a thread therebetween so as to form the preset centerline.

Optionally, the selecting a position of the vertical positioning assembly based on the preset centerline, and fixing the vertical positioning assembly on foundation steel bar includes:

selecting a first positioning point and a second positioning point on one side of the preset centerline in a horizontal direction, and connecting the first positioning point and the second positioning point through a thread therebetween so as to form a first edge line;

selecting a third positioning point and a fourth positioning point on the other side of the preset centerline, and connecting the third positioning point and the fourth positioning point through a thread therebetween so as to form a second edge line;

enabling the first edge line and the second edge line to be parallel to the preset centerline, and enabling a distance between the first edge line and the preset centerline and a distance between the second edge line and the preset centerline to be equal; and selecting a position of the vertical positioning assembly based on the first edge line and the second edge line, and fixing the vertical positioning assembly on the foundation steel bar.

Optionally, the vertical positioning assembly includes a column and a transverse rib;

the selecting a position of the vertical positioning assembly based on the first edge line and the second edge line, and fixing the vertical positioning assembly on the foundation steel bar includes:

providing a plurality of the columns extending in a vertical direction along both the first edge line and the second edge line, and fixing bottom ends of the columns on the foundation steel bar; and marking, according to the position of the centerline in the vertical direction, the position of the transverse rib in the vertical direction on the column, and fixing the transverse rib on the column.

Optionally, the positioning portion is a positioning through slot, and the positioning portion is provided at two ends of the positioning template in the first direction;

the mounting the positioning template to the vertical positioning assembly, and overlapping the positioning portion with the preset centerline in a vertical direction includes:

mounting the positioning template onto the transverse rib, and overlapping the positioning through slots at two ends of the positioning template with the preset centerline in the vertical direction.

Optionally, the centerline positioning assembly further includes a straightening template, a plurality of first mounting holes are formed on two sides of the preset centerline on the positioning template, the respective first mounting holes on the two sides of the preset centerline are symmetrically provided, the straightening template is provided with a plurality of second mounting holes that are provided in one-to-one correspondence with the first mounting holes in the vertical direction, there are a plurality of foundation bolts;

after mounting the foundation bolts in the first mounting holes in the positioning template, the method further includes:

mounting the respective foundation bolts in the first mounting holes in one-to-one correspondence, mounting a first straightening nut on each of the foundation bolts, mounting the straightening template on the foundation bolt through the second mounting hole, connecting the respective second mounting holes and the respective foundation bolts in one-to-one correspondence, mounting second straightening nuts on the foundation bolts above the straightening template, and adjusting perpendicularity of each foundation bolt by adjusting the first straightening nut and the second straightening nut.

The technical solution provided in the present disclosure may achieve the following beneficial effects:

The foundation bolt pre-embedding positioning mold and the method for mounting a foundation bolt provided in the present disclosure can determine the position of the positioning portion according to the position of the preset centerline, further, the position of the positioning template in the vertical direction and the horizontal direction is determined, and finally, the position of the foundation bolt mounted on the positioning template in the horizontal direction and the vertical direction is determined, thus realizing accurate positioning of the foundation bolt to a certain degree.

The additional technical features of the present disclosure and the advantages thereof will be more clearly illustrated in the following description, or may be understood through specific practice of the present disclosure.

As shown in FIG. 1 to FIG. 4, in one aspect, the present disclosure provides a foundation bolt pre-embedding positioning mold, including a centerline positioning assembly and a vertical positioning assembly for mounting on foundation steel bar; the centerline positioning assembly includes a positioning template 200 horizontally arranged, a positioning portion 220 is formed on the positioning template 200, the positioning portion 220 extends along a first direction, the positioning portion 220 is used to overlap with a preset centerline 700 in a vertical direction, and the first direction is a length direction of the positioning template 200; the positioning template 200 is configured to be mounted on the vertical positioning assembly, so as to fix a position of the positioning template 200 in the vertical direction; and a first mounting hole 210 is formed in the positioning template 200, so as to vertically fix the foundation bolt 400 to the positioning template 200.

The foundation bolt pre-embedding positioning mold provided in the embodiment of the present disclosure can determine the position of the positioning portion 220 according to the position of the preset centerline, further, the position of the positioning template 200 in the vertical direction and the horizontal direction is determined, and finally, the position of the foundation bolt 400 mounted on the positioning template 200 in the horizontal direction and the vertical direction is determined, thus realizing accurate positioning of the foundation bolt 400 to a certain degree.

Optionally, the positioning portion 220 is a positioning through slot formed in the positioning template 200. This makes the positioning portion 220 easier to process, and in the positioning process, an operator may observe through the positioning through slot whether it is aligned with the preset centerline 700, further improving the positioning accuracy.

Optionally, the first mounting hole 210 is provided on two sides of the positioning portion 220 in a second direction, and a distance between each of the first mounting holes 210 and the positioning portion 220 in the second direction is equal, wherein the second direction is perpendicular to the first direction, and the second direction is horizontally provided. When the positioning template 200 is processed, first, a position of each first mounting hole 210 is determined accurately through the distance relationship between the plurality of first mounting holes 210 and the positioning portion 220, which facilitates improving the accuracy of mounting the foundation bolt 400.

Optionally, the respective first mounting holes 210 in the same cross section of the positioning template 200 form a mounting hole group, there are a plurality of mounting hole groups, and the respective mounting hole groups are uniformly distributed in the first direction. By means of the foundation bolt pre-embedding positioning mold, accurate positioning of each foundation bolt 400 may be simultaneously realized, and construction efficiency is improved.

Optionally, the centerline positioning assembly further includes a straightening template 300, wherein the straightening template 300 is located on a side of the positioning template 200 facing away from the vertical positioning assembly, and a second mounting hole for mounting the foundation bolt 400 is formed in the straightening template 300, wherein the number of the second mounting holes is the same as the number of the first mounting holes 210, and the respective first mounting holes 210 and the respective second mounting holes are provided in one-to-one correspondence in the vertical direction, so that the positioning template 200 and the straightening template 300 are connected by the foundation bolt 400. When positioning a plurality of foundation bolts 400, by providing the straightening template 300 and the second mounting holes therein, the perpendicularity of the foundation bolts 400 can be adjusted according to the respective foundation bolts 400, the positioning template 200, and adjustment of the position limiting relationship between the templates, so as to improve the positioning accuracy of the foundation bolts 400.

Optionally, the straightening template 300 is parallel to the positioning template 200. In this way, when the straightening template 300 and the positioning template 200 are parallel to each other, an axial direction of each second mounting hole is perpendicular to the straightening template 300, further ensuring the perpendicularity of the foundation bolt 400 mounted in each second mounting hole. Certainly, a plurality of axially parallel holes may be formed in the straightening template 300, and during the mounting, it only needs to enable the respective holes to be fitted with the respective bolts, without the need to make the straightening template 300 parallel to the positioning template 200.

Optionally, the vertical positioning assembly includes a column 600 and a transverse rib 500, wherein the column 600 is vertically provided so as to fix a bottom end of the column 600 to foundation steel bar, the transverse rib 500 is fixed to the column 600, and the transverse rib 500 is horizontally provided so as to mount the positioning template 200 to the transverse rib 500. The position of the positioning template 200 in the vertical direction can be quickly determined by placing the positioning template 200 by the transverse rib 500 whose position in the vertical direction is determined, then the construction efficiency can be improved under the premise of ensuring certain positioning accuracy.

Optionally, two sides of the positioning template 200 are both provided with the column 600 in the second direction, one end of the transverse rib 500 is connected to the column 600 on one side of the positioning template 200, the other end of the transverse rib 500 is connected to the column 600 on the other side of the positioning template 200, the second direction is horizontal, and the second direction is perpendicular to the first direction. Connecting the transverse rib 500 to the columns 600 on the two sides of the positioning template 200 can improve the mounting strength of the transverse rib 500, further ensuring the stability of the positions of the positioning template 200 and the foundation bolt 400, making the foundation bolt 400 less movable during construction, and further improving the construction accuracy.

Optionally, the transverse rib 500 extends along the second direction. This allows the length of the transverse rib 500 to be relatively short, thereby reducing the production cost. Certainly, the transverse rib 500 also may be inclined relative to the second direction.

Optionally, at least two such columns 600 are provided on each side of the positioning template 200 in the second direction, and the respective columns 600 provided on the same side of the positioning template 200 are uniformly distributed in the first direction. Providing at least two columns 600 can allow mounting the transverse rib 500 between the columns 600 on the two side of the positioning template 200, so that the positioning template 200 is mounted on a plurality of transverse ribs 500, thus improving the positioning accuracy of the foundation bolts 400, and the stability of the foundation bolt pre-embedding positioning mold during construction.

Figure 5:
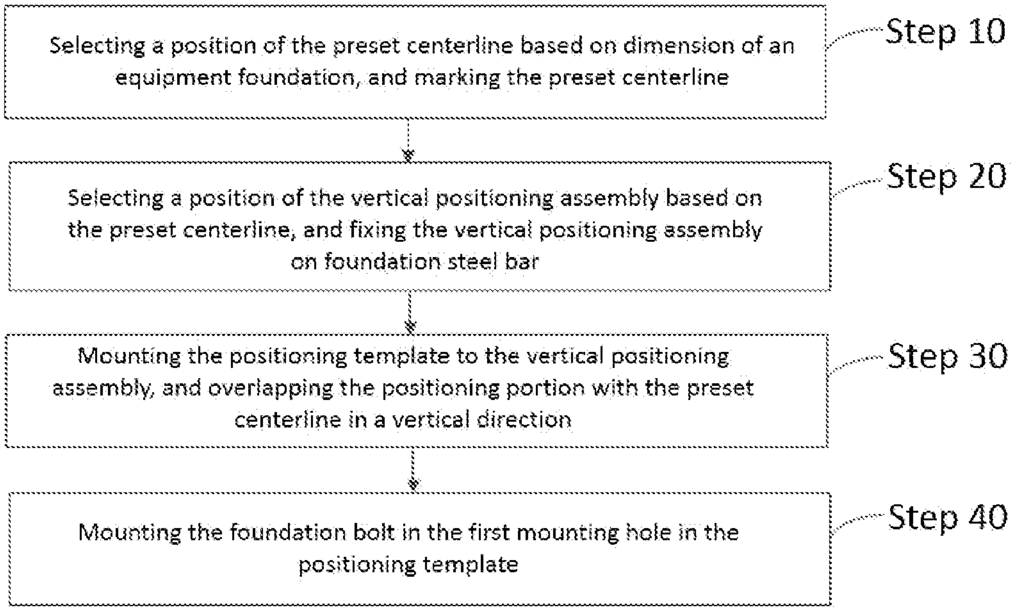
FIG. 5 is a first schematic flowchart of a method for mounting a foundation bolt provided in an embodiment of the present disclosure.
Figure 6:
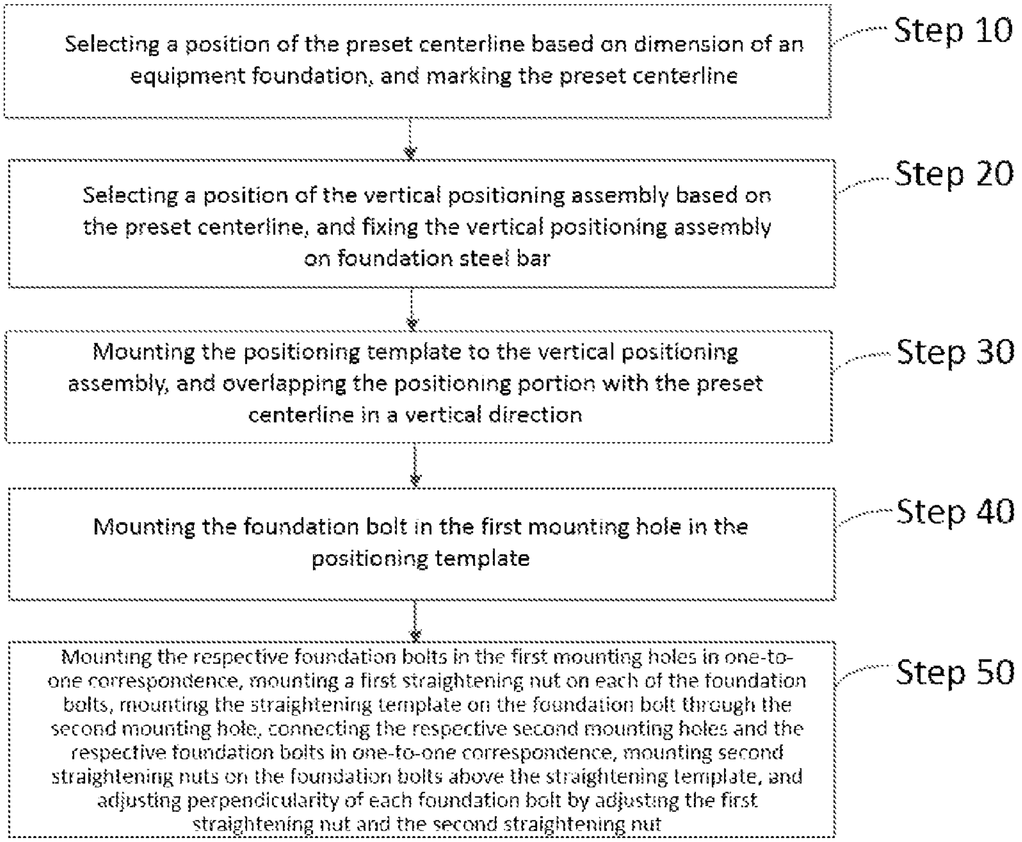
FIG. 6 is a second schematic flowchart of the method for mounting a foundation bolt provided in an embodiment of the present disclosure.

As shown in FIG. 5 and FIG. 6, in another aspect, the present disclosure provides a method for mounting a foundation bolt 400, wherein the method is implemented by applying the foundation bolt pre-embedding positioning mold provided in an embodiment of the present disclosure, and the method includes:

step 10: selecting a position of the preset centerline 700 based on dimension of an equipment foundation 100, and marking the preset centerline 700;

step 20: selecting a position of the vertical positioning assembly based on the preset centerline 700, and fixing the vertical positioning assembly on foundation steel bar;

step 30: mounting the positioning template 200 to the vertical positioning assembly, and overlapping the positioning portion 220 with the preset centerline 700 in a vertical direction; and step 40: mounting the foundation bolt 400 in the first mounting hole 210 in the positioning template 200.

The method for mounting a foundation bolt 400 provided in the embodiment of the present disclosure can determine the position of the positioning portion 220 according to the position of the preset centerline, further, the position of the positioning template 200 in the vertical direction and the horizontal direction is determined, and finally, the position of the foundation bolt 400 mounted on the positioning template 200 in the horizontal direction and the vertical direction is determined, thus realizing accurate positioning of the foundation bolt 400 to a certain degree.

In one embodiment of the method for mounting a foundation bolt 400 provided in the present disclosure, step 10 in the method for mounting a foundation bolt 400 provided in the present disclosure specifically includes the following contents:

selecting a first center point and a second center point respectively at two ends of the equipment foundation 100 in a length direction with a dotting positioning instrument, marking positions of the first center point and the second center point in the horizontal direction and the vertical direction, and connecting the first center point and the second center point through a thread therebetween so as to form the preset centerline 700, wherein the thread is preferably a steel wire rope; and a powder thread may also be used to replace the thread to form the preset centerline 700.

In one embodiment of the method for mounting a foundation bolt 400 provided in the present disclosure, step 20 in the method for mounting a foundation bolt 400 provided in the present disclosure specifically includes the following contents:

step 21: selecting a first positioning point and a second positioning point on one side of the preset centerline 700 in a horizontal direction, and connecting the first positioning point and the second positioning point through a thread therebetween so as to form a first edge line;

step 22: selecting a third positioning point and a fourth positioning point on the other side of the preset centerline, and connecting the third positioning point and the fourth positioning point through a thread therebetween so as to form a second edge line;

step 23: enabling the first edge line and the second edge line to be parallel to the preset centerline 700, and enabling a distance between the first edge line and the preset centerline 700 and a distance between the second edge line and the preset centerline 700 to be equal; and step 24: selecting a position of the vertical positioning assembly based on the first edge line and the second edge line, and fixing the vertical positioning assembly on the foundation steel bar.

In one embodiment of the method for mounting a foundation bolt 400 provided in the present disclosure, the vertical positioning assembly includes a column 600 and a transverse rib 500, on this basis, step 24 in the method for mounting a foundation bolt 400 provided in the present disclosure specifically includes the following contents:

step 24-1: providing a plurality of the columns 600 extending in a vertical direction along both the first edge line and the second edge line, and fixing bottom ends of the columns 600 on the foundation steel bar; and step 24-2: marking, according to the position of the centerline in the vertical direction, the position of the transverse rib 500 in the vertical direction on the column 600, and fixing the transverse rib 500 on the column 600.

Optionally, in one embodiment of the method for mounting a foundation bolt 400 provided in the present disclosure, the positioning portion 220 is a positioning through slot, and the positioning portion 220 is provided at both ends of the positioning template 200 in the first direction, then based on this, step 30 in the method for mounting a foundation bolt 400 provided in the present disclosure specifically includes the following contents:

step 30-1: mounting the positioning template 200 onto the transverse rib 500, and overlapping the positioning through slots at two ends of the positioning template 200 with the preset centerline 700 in the vertical direction.

Optionally, in one embodiment of the method for mounting a foundation bolt 400 provided in the present disclosure, the centerline positioning assembly further includes a straightening template 300, a plurality of first mounting holes 210 are formed on two sides of the preset centerline 700 on the positioning template 200, the respective first mounting holes 210 on the two sides of the preset centerline 700 are symmetrically provided, the straightening template 300 is provided with a plurality of second mounting holes that are provided in one-to-one correspondence with the first mounting holes 210 in the vertical direction, there are a plurality of foundation bolts 400, then on this basis, after step 40, the method for mounting a foundation bolt 400 provided in the present disclosure specifically contains the following contents:

step 40-1: mounting the respective foundation bolts 400 in the first mounting holes 210 in one-to-one correspondence, mounting a first straightening nut 410 on each of the foundation bolts 400, mounting the straightening template 300 on the foundation bolt 400 through the second mounting hole, connecting the respective second mounting holes and the respective foundation bolts 400 in one-to-one correspondence, mounting second straightening nuts 420 on the foundation bolts 400 above the straightening template 300, and adjusting the perpendicularity of each foundation bolt 400 by adjusting the first straightening nut 410 and the second straightening nut 420. The positioning template 200 is preferably fixed by a positioning nut 430 mounted on the foundation bolt 400 and located below the positioning template 200. In the embodiments of the present disclosure, the term “a plurality of” means two or more.

Finally, it should be noted that the various embodiments above are merely used for illustrating the technical solutions of the present disclosure, rather than limiting the present disclosure; while the detailed description is made to the present disclosure with reference to the various preceding embodiments, those ordinarily skilled in the art should understand that they still could modify the technical solutions recited in the various preceding embodiments, or make equivalent substitutions to some or all of the technical features therein. These modifications or substitutions do not make the essence of the corresponding technical solutions depart from the scope of the technical solutions of the various embodiments of the present disclosure.

What is claimed is:

1. A method for mounting a foundation bolt, wherein the method is implemented by applying a foundation bolt pre-embedding positioning mold. wherein the foundation bolt pre-embedding positioning mold comprises a centerline positioning assembly and a vertical positioning assembly which is configured to be mounted on a foundation steel bar, wherein the centerline positioning assembly comprises a positioning template horizontally arranged, wherein a positioning portion is provided on the positioning template, the positioning portion extends along a first direction, the positioning portion is configured to overlap with a preset centerline in a vertical direction, wherein the first direction is a length direction of the positioning template; the positioning template is configured to be mounted on the vertical positioning assembly, so as to fix a position of the positioning template in the vertical direction; and first mounting holes are provided in the positioning template, so as to vertically fix the foundation bolt to the positioning template, and the method comprises:

selecting a position of the preset centerline based on dimension of an equipment foundation, and marking the preset centerline;

selecting a position of the vertical positioning assembly based on the preset centerline, and fixing the vertical positioning assembly on the foundation steel bar;

mounting the positioning template to the vertical positioning assembly, and overlapping the positioning portion with the preset centerline in the vertical direction; and mounting the foundation bolt in a corresponding first mounting hole in the positioning template.

2. The method for mounting a foundation bolt according to claim 1, wherein the step of selecting a position of the preset centerline based on dimension of an equipment foundation and marking the preset centerline comprises:

selecting a first center point and a second center point, respectively, at two ends of the equipment foundation in a length direction by using a dotting positioning instrument, marking positions of the first center point and the second center point in the horizontal direction and the vertical direction, and connecting the first center point and the second center point through a thread therebetween, so as to form the preset centerline.

3. The method for mounting a foundation bolt according to claim 1, wherein the step of selecting a position of the vertical positioning assembly based on the preset centerline and fixing the vertical positioning assembly on the foundation steel bar comprises:

selecting a first positioning point and a second positioning point on one side of the preset centerline in the horizontal direction, and connecting the first positioning point and the second positioning point through a thread therebetween, so as to form a first edge line;

selecting a third positioning point and a fourth positioning point on the other side of the preset centerline, and connecting the third positioning point and the fourth positioning point through a thread therebetween, so as to form a second edge line, wherein the first edge line and the second edge line are parallel to the preset centerline, and a distance between the first edge line and the preset centerline is equal to a distance between the second edge line and the preset centerline; and selecting a position of the vertical positioning assembly based on the first edge line and the second edge line, and fixing the vertical positioning assembly on the foundation steel bar.

4. The method for mounting a foundation bolt according to claim 1, wherein the centerline positioning assembly further comprises a straightening template, a plurality of first mounting holes are provided on two sides of the preset centerline on the positioning template, the first mounting holes on the two sides of the preset centerline are symmetrically provided, the straightening template is provided with a plurality of second mounting holes configured to be provided in one-to-one correspondence with the first mounting holes in the vertical direction, a plurality of foundation bolts are provided;

after mounting the foundation bolts in the first mounting holes in the positioning template, the method further comprises:

mounting the foundation bolts in the first mounting holes in one-to-one correspondence, mounting a first straightening nut on each of the foundation bolts, mounting the straightening template on the foundation bolts through the second mounting holes, connecting the second mounting holes and the foundation bolts in one-to-one correspondence, mounting a second straightening nut on each of the foundation bolts above the straightening template, and adjusting perpendicularity of each of the foundation bolts by adjusting the first straightening nut and the second straightening nut.

5. A method for mounting a foundation bolt, wherein the method is implemented by applying a foundation bolt pre-embedding positioning mold, and the method comprises:

selecting a position of a preset centerline based on dimension of an equipment foundation, and marking the preset centerline;

selecting a position of a vertical positioning assembly based on the preset centerline, wherein the vertical positioning assembly is configured to be mounted on a foundation steel bar;

fixing the vertical positioning assembly on the foundation steel bar;

mounting a positioning template to the vertical positioning assembly, and overlapping a positioning portion with the preset centerline in a vertical direction; and mounting the foundation bolt in a corresponding first mounting hole in the positioning template.

* * * * *